(12) United States Patent
He et al.

(10) Patent No.: US 12,434,287 B1
(45) Date of Patent: Oct. 7, 2025

(54) HYDRAULIC ACTUATOR SHELL AND PREPARATION METHOD

(71) Applicant: TAIYUAN UNIVERSITY OF TECHNOLOGY, Taiyuan (CN)

(72) Inventors: Dongping He, Taiyuan (CN); Hao Yang, Taiyuan (CN); Zhihui Gao, Taiyuan (CN); Yuanming Liu, Taiyuan (CN); Tao Wang, Taiyuan (CN); Qingxue Huang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 19/267,452

(22) Filed: Jul. 11, 2025

(30) Foreign Application Priority Data

Mar. 28, 2025 (CN) .......................... 202510376959.3

(51) Int. Cl.
*B21C 37/15* (2006.01)
*B22F 3/11* (2006.01)

(52) U.S. Cl.
CPC .......... *B21C 37/156* (2013.01); *B22F 3/1125* (2013.01)

(58) Field of Classification Search
CPC .............................. B21C 37/156; B22F 3/1125
See application file for complete search history.

(56) References Cited

U.S. PATENT DOCUMENTS

2020/0298307 A1* 9/2020 Seeliger ................ C22C 1/0416

FOREIGN PATENT DOCUMENTS

| CN | 101865176 A | 10/2010 |
|---|---|---|
| CN | 102218851 A | 10/2011 |
| CN | 106944623 A | 7/2017 |
| CN | 206436577 U | 8/2017 |
| CN | 113020261 A | 6/2021 |
| CN | 115805257 A | 3/2023 |
| CN | 116550956 A | 8/2023 |
| CN | 117733153 A | 3/2024 |
| JP | H02258903 A | 10/1990 |

* cited by examiner

*Primary Examiner* — Ricardo D Morales

(57) ABSTRACT

Provided is a hydraulic actuator shell and a preparation method. The hydraulic actuator shell comprises a foam metal sandwich composite pipe, a foam metal sandwich flange and a foam metal sandwich end cover; the foam metal sandwich composite pipe is connected with one end of the foam metal sandwich flange, and the foam metal sandwich end cover is connected with the other end of the foam metal sandwich flange; the foam metal sandwich composite pipe comprises a first metal pipe layer, a first foam metal layer and a second metal pipe layer sequentially arranged from inside to outside; and a first bonding interface among the first metal pipe layer, the first foam metal layer and the second metal pipe layer is a metallurgical bonding interface. The hydraulic actuator shell is used for improving compression resistance, corrosion resistance and vibration and noise reduction capabilities of the hydraulic actuator shell.

5 Claims, 8 Drawing Sheets

HYDRAULIC ACTUATOR SHELL AND PREPARATION METHOD

CROSS REFERENCE TO RELATED APPLICATIONS

This application claims foreign priority of Chinese Patent Application No. 202510376959.3, filed on Mar. 28, 2025 in the China National Intellectual Property Administration, the disclosures of all of which are hereby incorporated by reference.

TECHNICAL FIELD

The present invention belongs to the technical field of metallic material preparation, and particularly relates to a hydraulic actuator shell and a preparation method.

BACKGROUND OF THE PRESENT INVENTION

As a core transmission assembly of deep-sea operation and ocean exploration, a deep-sea hydraulic actuator not only needs to withstand harsh conditions such as high pressure, high temperature and high humidity, but also needs to deal with dual challenges of seawater corrosion and mechanical vibration. In order to ensure survivability of equipment under high hydrostatic pressure in the deep sea, a shell of marine equipment must have excellent compression resistance performance. Meanwhile, in order to broaden an application scope, these shell need to have multiple functions under a coupling effect of complex multi-physical fields such as force, sound and electromagnetism.

Bimetallic composite materials and bimetallic composite plates have unique properties such as light weight, high strength, corrosion resistance, fatigue resistance and impact resistance by combining the advantages of two different metal elements, and have been widely used in aerospace, shipbuilding, petrochemical and other fields. However, due to high density, high rigidity and strong physical characteristics thereof, sound waves tend to reflect rather than absorb when contacting surfaces of the bimetallic composite materials and the bimetallic composite plates, especially resulting in difficulty in the absorption of high-frequency sound waves. In addition, a multi-layer interface inside the composite structure may also lead to complex reflection and refraction of the sound waves, further weakening a sound absorption performance of the composite construction.

With a unique pore structure, foam metal has shown remarkable advantages in light weight, high strength, energy absorption and vibration reduction, good heat conduction and excellent acoustic performance. Especially in the field of acoustics, the foam metal has become a new star in the field of sound absorption materials due to efficient sound insulation and absorption effects thereof. However, a low strength of the foam metal limits a bearing capacity and energy absorption characteristics thereof. Therefore, a thin-walled structure is usually filled with the foam metal to improve the stability, high strength and damping capacity of the whole structure. However, at present, foam metal composite materials are mainly based on mechanical bonding, which is difficult to meet high standard requirements of high strength, high stability and high corrosion resistance.

Therefore, there is an urgent need for a hydraulic actuator shell and a preparation method.

SUMMARY OF THE PRESENT INVENTION

The present invention aims to provide a hydraulic actuator shell and a preparation method, which are used for improving compression resistance, corrosion resistance, vibration reduction and noise reduction capabilities of the hydraulic actuator shell during deep-sea operation and ocean exploration.

In order to achieve the above objects, the present invention provides a following technical solution:

In a first aspect, the present invention provides a hydraulic actuator shell, which comprises a foam metal sandwich composite pipe, a foam metal sandwich flange and a foam metal sandwich end cover, wherein:

the foam metal sandwich composite pipe is connected with one end of the foam metal sandwich flange, and the foam metal sandwich end cover is connected with the other end of the foam metal sandwich flange; and the foam metal sandwich composite pipe comprises a first metal pipe layer, a first foam metal layer and a second metal pipe layer sequentially arranged from inside to outside; and a first bonding interface among the first metal pipe layer, the first foam metal layer and the second metal pipe layer is a metallurgical bonding interface.

Alternatively, the foam metal sandwich flange is in an annular cylindrical structure, the foam metal sandwich end cover is a cylindrical structure, an outer diameter of the foam metal sandwich flange is the same as a diameter of the foam metal sandwich end cover, six first through holes are uniformly arranged on a toroidal surface of the foam metal sandwich flange along a circumferential direction, and six second through holes in one-to-one correspondence with the first through holes are arranged on a circular surface of the foam metal sandwich end cover.

Alternatively, the foam metal sandwich end cover and the foam metal sandwich flange are cut by a foam metal sandwich composite plate, the foam metal sandwich composite plate sequentially comprises a first corrugated metal layer, a second foam metal layer and a second corrugated metal layer from top to bottom, a bonding interface among the first corrugated metal layer, the second corrugated metal layer and the second foam metal layer is a second metallurgical bonding interface, and the second bonding interface is a corrugated interface.

Compared with the prior art, the hydraulic actuator shell provided by the present invention comprises the foam metal sandwich composite pipe, the foam metal sandwich flange and the foam metal sandwich end cover; the foam metal sandwich composite pipe comprises the first metal pipe layer, the first foam metal layer and the second metal pipe layer sequentially arranged from inside to outside; and the first bonding interface among the first metal pipe layer, the first foam metal layer and the second metal pipe layer is the metallurgical bonding interface. In this solution, the foam metal sandwich composite pipe is made of a foam metal sandwich material, and the bonding interfaces of various structures are the metallurgical bonding interfaces. The foam metal sandwich composite pipe material has high strength, high stability, high corrosion resistance and excellent sound absorption and vibration reduction performance. The hydraulic actuator shell prepared from this material not only has light weight, high strength and excellent sound absorption and vibration reduction performance, but also can maintain excellent performances in extreme environments such as high pressure, low temperature and high salt in the deep sea, thus meeting an urgent demand for high-performance functional shell materials for deep-sea hydraulic actuators.

In a second aspect, the present invention provides a preparation method of a hydraulic actuator shell used for preparing the hydraulic actuator shell, wherein the method comprises:

providing one composite pipe blank, wherein the composite pipe blank comprises a first metal pipe layer, an annular prefabricated foam blank and a second metal pipe layer from inside to outside;

heating the composite pipe blank to a target temperature, and forming the composite pipe blank by extrusion to raise a temperature of a first contact interface between structures of the composite pipe blank to a preset temperature in a forming process, wherein the preset temperature is greater than or equal to a melting point temperature of the annular pre-fabricated foam blank, and the first contact interface is re-melt to form a first metallurgical bonding interface to obtain a target composite pipe blank; and the target temperature is smaller than the melting point temperature;

placing the target composite pipe blank in a heating furnace and foaming a middle layer of the target composite pipe blank to form a first foam metal layer and obtain a foam metal sandwich composite pipe; and assembling a foam metal sandwich composite pipe, a foam metal sandwich flange and a foam metal sandwich end cover to form the hydraulic actuator shell.

Alternatively, the target temperature comprises a first target temperature and a second target temperature; and the heating the composite pipe blank to the target temperature, and forming the composite pipe blank by extrusion to raise the temperature of the first contact interface between the structures of the composite pipe blank to the preset temperature in the forming process, wherein the preset temperature is greater than or equal to the melting point temperature of the annular pre-fabricated foam blank, and the first contact interface is re-melt to form a first metallurgical bonding interface to obtain a target composite pipe blank, comprises:

putting the composite pipe blank into a first annular cavity formed by an extrusion inner mold and an extrusion outer mold;

fixing the extrusion outer mold by an extruder, starting a first induction heating coil arranged in the extrusion inner mold to heat the first metal pipe layer to the first target temperature, and starting a second induction heating coil arranged in the extrusion outer mold to heat the second metal pipe layer to the second target temperature, and pushing one end of the extrusion inner mold by an extrusion head to move along an axial direction of the composite pipe blank, so that the composite pipe blank is extruded from an extrusion end of the first annular cavity and formed, and the temperature of the first contact interface is raised to a preset temperature during extrusion, and the first contact interface is re-melt to form the first metallurgical bonding interface, to obtain the target composite pipe blank, wherein the extrusion end is used for applying a radial pressure to the composite pipe blank.

Alternatively, before assembling the foam metal sandwich composite pipe, the foam metal sandwich flange and the foam metal sandwich end cover, the method further comprises:

preparing the foam metal sandwich flange and the foam metal sandwich end cover;

wherein, the preparing the foam metal sandwich flange and the foam metal sandwich end cover, comprises:

providing one composite plate blank, wherein the composite plate blank sequentially comprises a first corrugated metal layer, a square pre-fabricated foam blank and a second corrugated metal layer from top to bottom; and the first corrugated metal layer and the second corrugated metal layer are corrugated metal plates with a corrugated interface on one side;

heating the composite plate blank, heating the first corrugated metal layer to the first target temperature, and heating the second corrugated metal layer to the second target temperature to obtain a composite plate blank with different temperatures;

rolling the composite plate blank with different temperatures to tightly combine the first corrugated metal layer, the square pre-fabricated foam blank layer and the second corrugated metal layer, and raising a temperature of a second contact interface between structures of the composite plate blank with different temperatures to a preset temperature in a deforming process, wherein the preset temperature is greater than or equal to the melting point temperature, and the second contact interface is re-melt to form a second metallurgical interface to obtain a target composite plate;

placing the target composite plate in a heating furnace with a temperature being a third target temperature for a preset time, so that a middle layer of the target composite plate is foamed to form a second foam metal layer and obtain a foam metal sandwich composite plate; and cutting the foam metal sandwich composite plate according to a preset size to obtain two foam metal sandwich flanges and two foam metal sandwich end covers.

Alternatively, before providing one composite plate blank, the method further comprises:

preparing a composite plate blank;

wherein, the preparing the composite plate blank, comprises:

providing two metal plates;

putting a second foaming powder into a square mold, and pressing the second foaming powder to obtain a square pre-fabricated foam blank;

rolling the two metal plates by a corrugation-flattening mill to obtain the first corrugated metal layer and the second corrugated metal layer; wherein an upper roll of the corrugation-flattening mill is a corrugation roll, and a lower roll of the corrugation flattening mill is a flattening roll; and placing the square pre-fabricated foam blank between the first corrugated metal layer and the second corrugated metal layer for blank assembling to obtain the composite plate blank.

Alternatively, the foam metal sandwich composite pipe is prepared by an extrusion tool, and the extrusion tool comprises:

the extrusion inner mold, wherein the extrusion inner mold comprises an inner mold cylinder with a T-shaped structure, the inner mold cylinder comprises a head part and a tailing part, the tailing part is provided with a cylinder cavity; the first induction heating coil is arranged in the cylinder cavity, an inner mold insulating pad is arranged between the first induction heating coil and the cylinder cavity, an inner mold end cover is arranged at one end of the cylinder cavity far from the head part, the inner mold end cover is connected with the inner mold cylinder through an inner mold fastening screw, and the inner mold end cover is used for forming an enclosed space in the cylinder cavity;

the extrusion outer mold, wherein the second induction heating coil is arranged in the extrusion outer mold, an inner wall of the extrusion outer mold comprises a large-diameter section, a slope section and a small-diameter section, the large-diameter section and the small-diameter section are in transition connection through the slope section, the large-diameter section of the extrusion outer mold is matched and sleeved with the head part of the inner mold cylinder, the first annular cavity is formed between the inner wall of the extrusion outer mold and a tailing part of the extrusion inner mold, and one end of the first annular cavity close to the small-diameter section is an extrusion end;

the extruder, used for clamping and fixing an outer wall of the extrusion outer mold; and the extrusion head, used for pushing the extrusion inner mold to make the composite pipe blank move along the axial direction and be extruded from the extrusion end of the first annular cavity.

Alternatively, a body of the extrusion outer mold is an outer mold cylinder, a second annular cavity is arranged between an inner wall and an outer wall of the large-diameter section, a second induction heating coil is arranged in the second annular cavity, the second induction heating coil is separated from the second annular cavity by an outer mold insulating pad, an outer mold end cover is arranged at one end of the second annular cavity far from the small-diameter section, and the outer mold end cover is connected with the outer mold cylinder to form an enclosed space in the second annular cavity.

Alternatively, before providing one composite pipe blank, the method further comprises:

preparing a composite pipe blank;

wherein, the preparing the composite pipe blank, comprises:

mixing a metal powder, a tackifier and a foaming agent powder according to a preset ratio to obtain a foaming powder; wherein the foaming powder comprises a first foaming powder and a second foaming powder;

pouring the first foaming powder into a third annular cavity consisting of an outer mold for pipe blank forming and an inner mold for pipe blank forming, starting a first vibrating base of a pipe blank sleeve mold, and pressing the foaming powder into an annular pre-fabricated foam blank by using an annular extrusion head during a vibrating process of the first vibrating base; and placing the annular pre-fabricated foam blank in a gap between the first metal pipe layer and the second metal pipe layer of the composite pipe blank to obtain the composite pipe blank.

Compared with the prior art, according to the preparation method of the hydraulic actuator shell provided by the present invention, the composite pipe blank is heated to the target temperature, the pipe composite blank is formed by extrusion, and meanwhile the temperature of the first contact interface between various structures of the composite pipe blank is raised to the preset temperature under the action of deformation heat by extrusion, the preset temperature is greater than or equal to the melting point temperature of the annular pre-fabricated foam blank, and then the first contact interface is re-melt to form the first metallurgical bonding interface to obtain the target composite pipe blank. As the temperature of the first contact interface reaches the preset temperature under the action of the deformation heat, the temperature may not be raised too much. Therefore, the temperature of the first contact interface may reach the melting point temperature but does not reach a foaming temperature of the middle layer of the composite pipe blank. The middle layer of the composite pipe blank may not be foamed during the process of extrusion, so various structures of the composite pipe blank are combined more tightly under the action of extrusion. Then, the target composite pipe blank is placed in the heating furnace to foam the middle layer of the target composite pipe blank, thereby obtaining the foam metal sandwich composite pipe. The foam metal sandwich composite pipe, the foam metal sandwich flange and the foam metal sandwich end cover are then assembled to form the hydraulic actuator shell. According to the method, the first contact interface of the composite pipe blank is re-melt in the extrusion process to form metallurgical bonding, and meanwhile, a foaming blank in the middle layer of the composite pipe blank is prevented from foaming in advance, so that the foaming process is accurately controlled, thus effectively solving a problem that it is difficult to realize close metallurgical bonding between foam metal and matrix metal at present. The foam metal sandwich composite pipe material prepared by the method has high strength, high stability, high corrosion resistance and excellent sound absorption and vibration reduction performance. The hydraulic actuator shell prepared from this material not only has light weight, high strength and excellent sound absorption and vibration reduction performance, but also can maintain excellent performances in extreme environments such as high pressure, low temperature and high salt in the deep sea, thus meeting an urgent demand for high-performance functional shell materials for deep-sea hydraulic actuators.

DESCRIPTION OF THE DRAWINGS

The accompanying drawings illustrated here serve to provide a further understanding of the present invention and constitute a part of the application, and the illustrative embodiments of the present invention and together with the description thereof serve to explain the invention, and do not constitute inappropriate definition to the present invention. In the drawings.

REFERENCE NUMERALS

Figure 1:
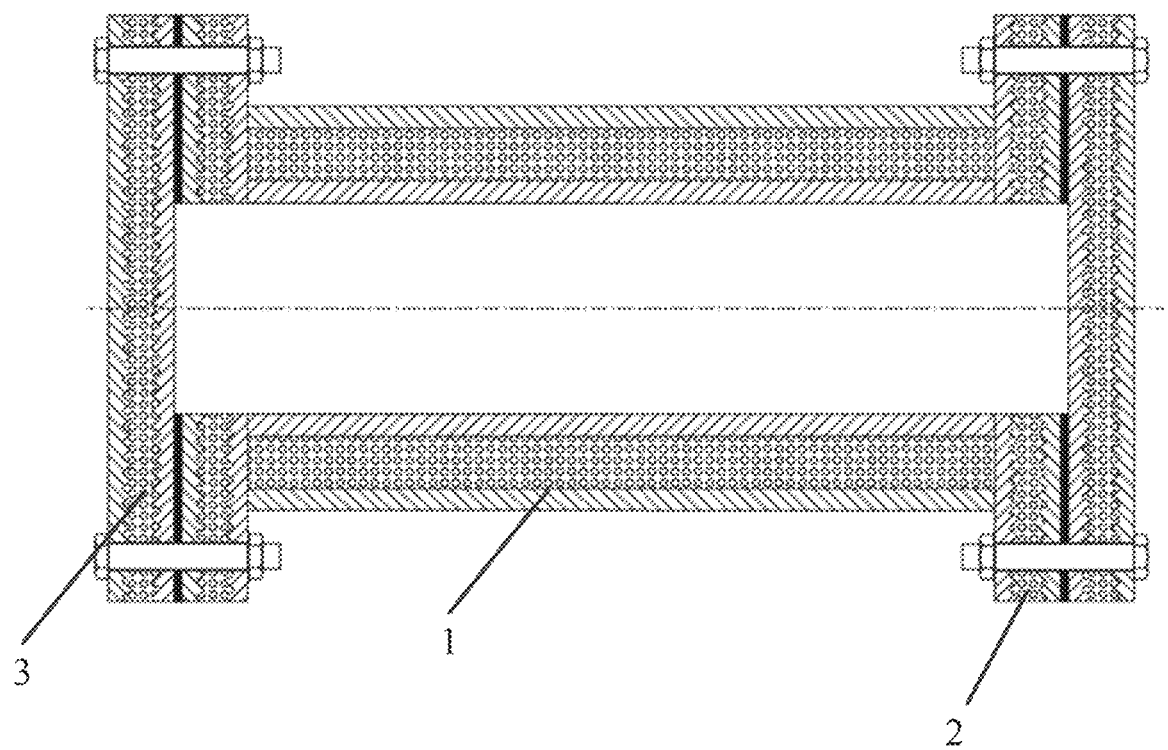
FIG. 1 is a schematic structure diagram of a hydraulic actuator shell provided by the present invention.

1—foam metal sandwich composite pipe, 11—first metal pipe layer, 12—first foam metal layer, 13—second metal pipe layer, 14—annular pre-fabricated foam blank, 2—foam metal sandwich flange, 21—first through hole, 3—foam metal sandwich end cover, 31—second through hole, 4—foam metal sandwich composite plate, 41—first corrugated metal layer, 42—second foam metal layer, 43—second corrugated metal layer, 101 inner mold for pipe blank forming, 102—outer mold for pipe blank forming, 103—first vibrating base, 104—annular extrusion head, 5—extrusion inner mold, 51—inner mold cylinder, 52—inner mold circular insulating pad, 53—first induction heating coil, 54—inner mold end cover, 55—inner mold strip-shaped insulating glue cushion, 56—inner mold fastening screw, 6—extrusion outer mold, 61—outer mold cylinder, 62—second induction heating coil, 63—outer mold end cover, 64—outer mold fastening screw, 65—outer mold strip-shaped insulating glue cushion, 66—outer mold annular insulating pad, 7—extruder, 8—extrusion head, 9—graphite gasket, 10—target composite pipe blank, 141—square extrusion head, 142—square mold, 143—second vibrating base, 144—square pre-fabricated foam blank, 161—third induction heating coil, and 162—fourth induction heating coil.

DETAILED DESCRIPTION OF PREFERRED EMBODIMENTS

To make the technical problems to be solved, technical solutions, and beneficial effects of the present invention clearer, the present invention will be further described in details hereinafter with reference to the accompanying drawings and embodiments. It should be understood that the specific embodiments described herein are only used to explain the present invention, but are not intended to limit the present invention.

It should be noted that when an element is called to be "fixed" to or "arranged on" another element, it may be directly fixed to or arranged on another element or indirectly fixed to or arranged on another element. When an element is considered to be "connected" to another element, it may be directly connected to another element or indirectly connected to another element.

Moreover, the terms "first" and "second" are used for descriptive purposes only and cannot be understood as indicating or implying relative importance, or implicitly indicating the quantity of technical features indicated. Therefore, the features defined with "first" and "second" can explicitly or implicitly include one or more of the features. In the description of the present invention, the meaning of "a plurality of" is two or more than two unless otherwise specifically defined. The meaning of "several" is one or more than one unless otherwise specifically defined.

In the description of the present invention, it should be understood that, the orientation or position relationship related to the orientation description, such as the orientation or position relationship indicated by the terms "up", "down", "front", "back", "left", "right" and the like is based on the orientation or position relationship shown in the drawings, which is only used for convenience of the description of the present invention and simplification of the description instead of indicating or implying that the indicated device or element must have a specific orientation, and be constructed and operated in a specific orientation, and thus should not be understood as a limitation to the present invention.

In the description of the present invention, it should be noted that terms such as "installation", "connected" and "connection", etc., should be understood broadly, for example, the connection may be fixed connection, or detachable connection or integral connection; may also be mechanical connection or electrical connection; and may be direct connection, may also be indirect connection through an intermediate medium, and may also be internal communication of two elements or interaction relationship of two elements. The specific meaning of the above terms in the present invention can be understood in a specific case by those of ordinary skills in the art.

With the depletion of land and coastal resources, global maritime powers have shifted their development focus from offshore to deep-sea areas. The rapid progress of deep-sea equipment makes it possible to develop and utilize deep-sea resources on a large scale. However, the extreme environment such as high pressure, low temperature and high salt in the deep sea poses a severe challenge to the shell design of the marine equipment. At present, a deep-sea hydraulic actuator is usually made of a foam metal sandwich material with mechanical bonding as a main material, which is difficult to requirements of high strength, high stability and high corrosion resistance.

In order to solve the above problems, the present invention provides a hydraulic actuator shell and a preparation method, which will be described with the accompanying drawings below.

Referring to FIG. 1, the present invention provides a hydraulic actuator shell, which comprises a foam metal sandwich composite pipe 1, a foam metal sandwich flange 2 and a foam metal sandwich end cover 3.

The foam metal sandwich composite pipe 1 is connected with one end of the foam metal sandwich flange 2, and the foam metal sandwich end cover 3 is connected with the other end of the foam metal sandwich flange 2.

Figure 2:
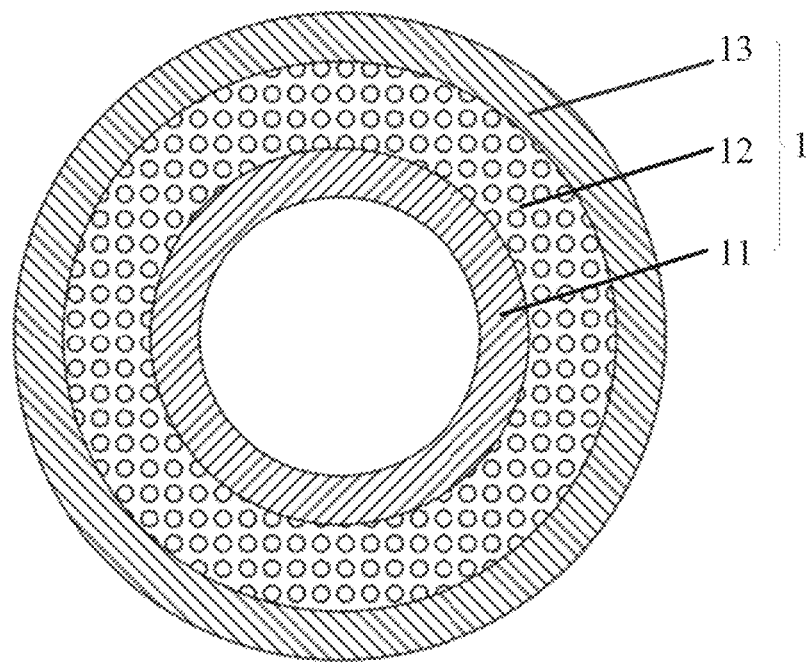
FIG. 2 is a top view of a foam metal sandwich composite pipe provided by the present invention.

Referring to FIG. 2, the foam metal sandwich composite pipe comprises a first metal pipe layer 11, a first foam metal layer 12 and a second metal pipe layer 13 sequentially arranged from inside to outside. A first bonding interface among the first metal pipe layer 11, the first foam metal layer 12 and the second metal pipe layer 13 is a metallurgical bonding interface.

A bonding interface between various structures of the foam metal sandwich flange 2 is a metallurgical bonding interface, while a bonding interface between various structures of the foam metal sandwich end cover 3 is a metallurgical bonding interface.

The first bonding interface is formed by interface remelting after a temperature of a first contact interface is raised to a preset temperature under the action of extrusion, and the first contact interface is a contact interface between various structures of a composite pipe blank.

Materials of the first metal pipe layer 11 and the second metal pipe layer 13 in the above structure may be seamless metal pipes.

According to the above structure, the hydraulic actuator shell provided by the present invention is composed of the foam metal sandwich composite pipe, the foam metal sandwich flange and the foam metal sandwich end cover, which can effectively meet the performance requirements of vibration reduction and sound absorption, and meanwhile, a variety of external cladding metals, such as titanium/stainless steel, titanium/aluminum, titanium/copper and other foam metal sandwich composite pipes, flanges and end covers may be selected according to different requirements. The foam metal sandwich composite pipe, the foam metal sandwich flange and the foam metal sandwich end cover are all made of foam metal sandwich materials, and the bonding interface of various structures is a metallurgical bonding interface. The foam metal sandwich composite pipe, the foam metal sandwich flange and the foam metal sandwich end cover have high strength, high stability, high corrosion resistance and excellent sound absorption and vibration reduction performance. The hydraulic actuator shell made of these materials not only has light weight, high strength and excellent sound absorption and vibration reduction performance, but also can maintain excellent performance in extreme environments such as deep sea high pressure, low temperature and high salt, thus meeting the urgent demand for high-performance functional shell materials for deep sea hydraulic actuators.

Figure 3:
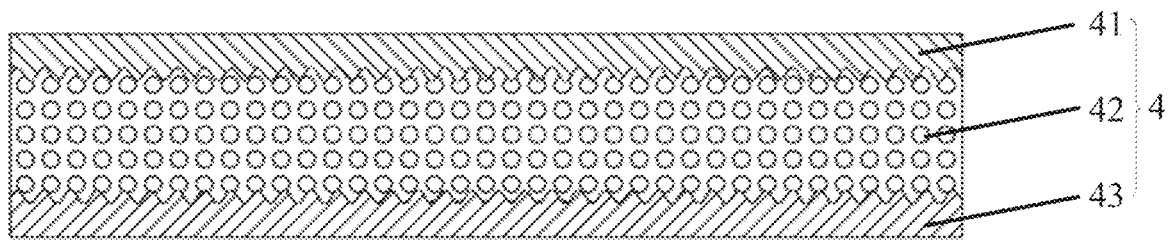
FIG. 3 is a schematic structural diagram of a foam metal sandwich composite plate provided by the present invention.
Figure 4:
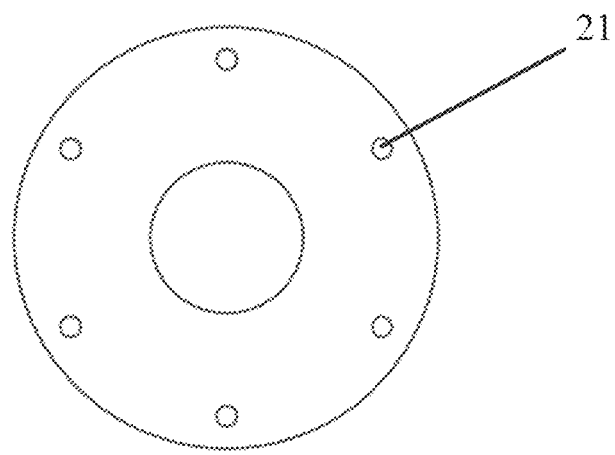
FIG. 4 is a top view of a foam metal sandwich flange provided by the present invention.
Figure 5:
FIG. 5 is a sectional drawing of the foam metal sandwich flange provided by the present invention.
Figure 6:
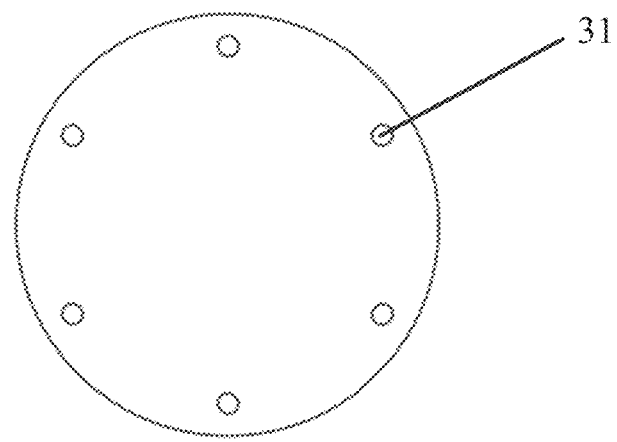
FIG. 6 is a top view of a foam metal sandwich end cover provided by the present invention.
Figure 7:
FIG. 7 is a sectional drawing of the foam metal sandwich end cover provided by the present invention.

Referring to FIG. 3, the foam metal sandwich flange 2 and the foam metal sandwich end cover 3 in the above structure are obtained by cutting a foam metal sandwich composite plate 4. As shown in FIG. 3, the foam metal sandwich composite plate 4 sequentially comprises a first corrugated metal layer 41, a second foam metal layer 42 and a second corrugated metal layer 43 from top to bottom. A bonding interface between the first corrugated metal layer 41 and the second foam metal layer 42 and a bonding interface between the second corrugated metal layer 43 and the second foam metal layer 42 are collectively referred to as a second bonding interface. The second bonding interface is a metallurgical bonding interface and a corrugated interface. The first corrugated metal layer is made of the same material as the first metal pipe layer, and the second corrugated metal layer is made of the same material as the second metal pipe layer.

Referring to FIG. 4 to FIG. 7, the foam metal sandwich flange 2 in the above structure is an annular cylindrical structure, and the foam metal sandwich end cover 3 is a cylindrical structure. An outer diameter of the foam metal sandwich flange 2 is the same as a diameter of the foam metal sandwich end cover 3, and an inner diameter of the foam metal sandwich flange 2 is the same as an inner diameter of the foam metal sandwich composite pipe 1. Six through holes 21 are uniformly arranged on a toroidal surface of the foam metal sandwich flange 2 along a circumferential direction, and six second through holes 31 in one-to-one correspondence with the first through holes 21 are arranged on a circular surface of the foam metal sandwich end cover 3.

With reference to FIG. 1, quantities of the foam metal sandwich flange and the foam metal sandwich end cover constituting the hydraulic actuator shell are both two, wherein one foam metal sandwich flange is connected with one end of the foam metal sandwich composite pipe by welding, and the other foam metal sandwich flange is connected with the other end of the foam metal sandwich composite pipe by welding. The foam metal sandwich flange and the foam metal sandwich end cover are firmly connected by a bolt, and the bolt penetrates through the first through hole and the second through hole.

Metals in the first foam metal layer and the second foam metal layer in the above structure may be metals or alloys such as aluminum, copper, iron, nickel, titanium or stainless steel which can form stable bubbles by heating and foaming.

The foam metal has effective sound insulation and absorption effect, but a low strength of the foam metal limits a bearing capacity and energy absorption characteristics thereof. At present, a thin-walled structure is usually added to the foam metal to improve a stability, a strength and a damping capacity of the whole structure. However, the structures are only mechanically combined, and the obtained foam metal sandwich composite cannot meet the high standard requirements of high strength, high stability and high corrosion resistance in extreme deep-sea environment. Moreover, it is difficult to realize close metallurgical bonding between the foam metal and the matrix metal in the preparation of an existing foam metal composite material.

Figure 8:
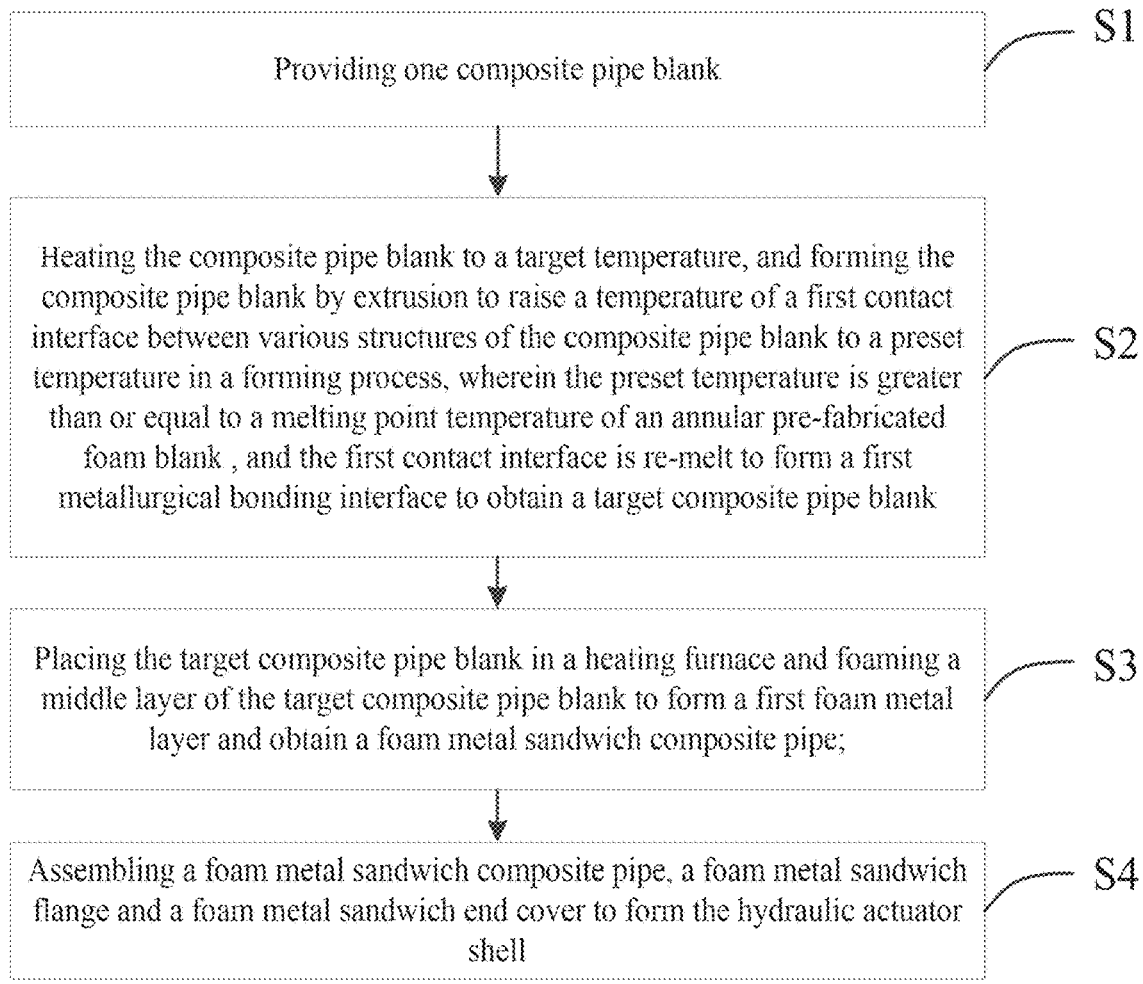
FIG. 8 is a flow chart of a preparation method of a hydraulic actuator shell provided by the present invention.
Figure 9:
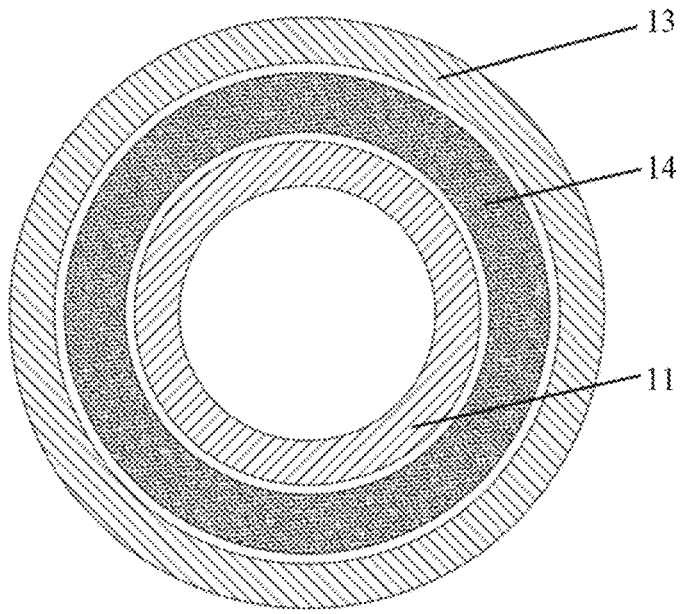
FIG. 9 is a schematic structural diagram of a composite pipe blank provided by the present invention.

In order to solve the technical problem, the present invention further provides a preparation method of a hydraulic actuator shell, which is used for preparing the hydraulic actuator shell mentioned above. As shown in FIG. 8, the preparation method of the hydraulic actuator shell comprises the following steps:

Step S1: providing one composite pipe blank, wherein:
as shown in FIG. 9, the composite pipe blank sequentially comprises a first metal pipe layer 11, an annular pre-fabricated foam blank 14 and a second metal pipe layer 13 from inside to outside.

The first metal pipe layer and the second metal pipe layer are two different seamless metal pipes with high strength and corrosion resistance.

Step S2: heating the composite pipe blank to a target temperature, and forming the composite pipe blank by extrusion to raise a temperature of a first contact interface between structures of the composite pipe blank to a preset temperature in a forming process, wherein the preset temperature is greater than or equal to a melting point temperature of the annular pre-fabricated foam blank, and the first contact interface is re-melt to form a first metallurgical bonding interface to obtain a target composite pipe blank;

wherein, the melting point temperature is a melting point temperature of the annular pre-fabricated foam blank, and the target temperature is smaller than the melting point temperature;

the step S2 further comprises the step of calculating a target temperature according to equation (1), as shown in equation (1):

$$T \approx T_m - \frac{248}{\rho \cdot Cp} \quad (1)$$

wherein, T is a target temperature, T is a melting point temperature of the annular pre-fabricated foam blank, $\rho$ is a specific density of the first metal pipe layer or a specific density of the second metal pipe layer, and $\rho$ is a specific heat capacity of the first metal pipe layer or a specific heat capacity of the second metal pipe layer.

when materials of the first metal pipe layer and the second metal pipe layer are different, the heating temperatures are different, the target temperature obtained by calculating according to the specific density and the specific heat capacity of the first metal pipe layer is a first target temperature, and the target temperature obtained by calculating according to the specific density and the specific heat capacity of the second metal pipe layer is a second target temperature; wherein, the first target temperature and the second target temperature are both smaller than the melting point temperature.

Step S3: placing the target composite pipe blank in a heating furnace and foaming a middle layer of the target composite pipe blank to form a first foam metal layer and obtain a foam metal sandwich composite pipe;

Specifically, the target composite pipe blank is placed in a heating furnace with a temperature being a third target temperature for a certain period of time, during a heating process, a foaming agent is decomposed to generate bubbles, the annular pre-fabricated foam blank in the middle layer of the target composite pipe blank forms a second foam metal layer, and after the heat preservation is completed, the foam metal sandwich composite pipe with metallurgical bonding interface is obtained. The third target temperature is greater than or equal to a foaming temperature of the annular pre-fabricated foam blank.

Step S4: assembling a foam metal sandwich composite pipe, a foam metal sandwich flange and a foam metal sandwich end cover to form the hydraulic actuator shell.

It should be noted that the foam metal sandwich composite pipe is prepared from the composite pipe blank through heating, extrusion, thermal insulation foaming and other steps.

According to the preparation method of the hydraulic actuator shell provided by the present invention, as the temperature of the first contact interface is raised to the preset temperature under the action of deformation heat by extrusion, the temperature may not be raised too much. Therefore, the temperature of the first contact interface may reach the melting point temperature but does not reach the foaming temperature of the middle layer of the composite pipe blank. The middle layer of the composite pipe blank may not be foamed during the process of extrusion, so various structures of the composite pipe blank are combined more tightly under the action of extrusion. Then, the target composite pipe blank is placed in the heating furnace to foam the middle layer of the target composite pipe blank, thereby obtaining the foam metal sandwich composite pipe. The foam metal sandwich composite pipe, the foam metal sandwich flange and the foam metal sandwich end cover are then assembled to form the hydraulic actuator shell. According to the method, the first contact interface of the composite pipe blank is re-melt in the extrusion process to form metallurgical bonding, and meanwhile, the annular pre-fabricated foam blank in the middle layer of the composite pipe blank is prevented from foaming in advance, so that the foaming process is accurately controlled, thus effectively solving a problem that it is difficult to realize close metallurgical bonding between the foam metal and a matrix metal at present. As for the foam metal sandwich composite pipe material prepared by this method, an inner layer and an outer layer of the material are seamless metal pipes with high corrosion resistance, and a core layer of the material is filled with foam metal. The foam metal sandwich composite pipe material has high strength, high stability, high corrosion resistance and excellent sound absorption and vibration reduction performance. The hydraulic actuator shell prepared from this material not only has light weight, high strength and excellent sound absorption and vibration reduction performance, but also can maintain excellent performances in extreme environments such as high pressure, low temperature and high salt in the deep sea, thus meeting an urgent demand for high-performance functional shell materials for deep-sea hydraulic actuators.

Based on the above method, the present invention further provides some specific embodiments, which will be described in detail below.

Alternatively, before providing one composite pipe blank, the method further comprises:

preparing a composite pipe blank by a pipe blank sleeve mold.

Figure 10:
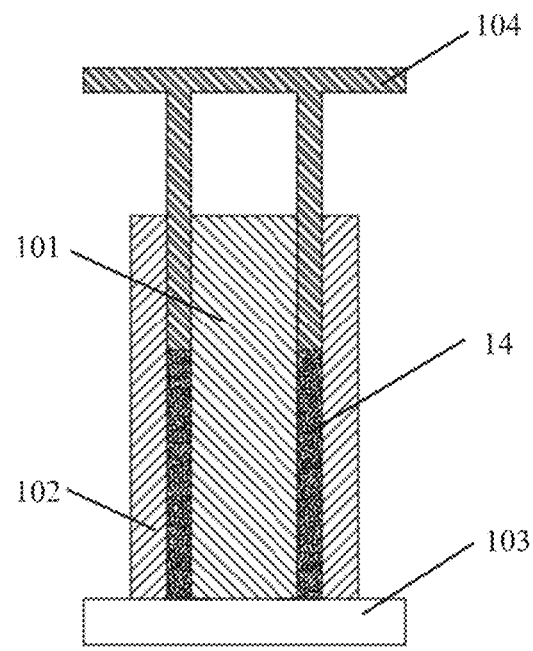
FIG. 10 is a schematic diagram of forming an annular pre-fabricated foam blank provided by the present invention.

Referring to FIG. 10, the pipe blank sleeve mold above comprises an inner mold for pipe blank forming 101, an outer mold for pipe blank forming 102, an annular extrusion head 104, and a first vibrating base 103. The inner mold for pipe blank forming 101 is a cylindrical structure, the outer mold for pipe blank forming 102 is sleeved on an outer surface of the inner mold for pipe blank forming 101, and a third annular cavity is formed between the inner mold for pipe blank forming 101 and the outer mold for pipe blank forming 102. A lower surface of the inner mold for pipe blank forming 101 and a lower surface of the outer mold for pipe blank forming 102 are connected with an upper surface of the first vibrating base 103. The annular extrusion head 104 comprises a head part and a tailing part. The head part of the annular extrusion head 104 may be a metal plate with circular upper and lower surfaces. The tailing part of the annular extrusion head 104 is an annular cylinder, and the tailing part of the annular extrusion head 104 is matched and sleeved with the third annular cavity. Preparing the composite pipe blank comprises the following steps:

mixing a metal powder, a tackifier and a foaming agent powder according to a preset ratio to obtain a foaming powder;

because foaming powders adopted in the first metal foam layer for preparing the foam metal sandwich composite pipe and the second metal foam layer for preparing the foam metal sandwich plate are of the same material, the foaming powder is divided into a first foaming powder and a second foaming powder;

pouring the first foaming powder into a third annular cavity consisting of an outer mold for pipe blank forming 102 and an inner mold for pipe blank forming 101, starting a first vibrating base 103 of a pipe blank sleeve mold, and pressing the foaming powder into an annular pre-fabricated foam blank 14 by using an annular extrusion head 104 during a vibrating process of the first vibrating base 103; and placing the annular pre-fabricated foam blank 14 in a gap between the first metal pipe layer 11 and the second metal pipe layer 13 of the composite pipe blank to obtain the composite pipe blank.

Alternatively, when materials of the first metal pipe layer and the second metal pipe layer in the above step S2 are different, the target temperature comprises the first target temperature and the second target temperature; the target composite pipe blank in the step S2 may be prepared by using the extrusion tool, wherein the composite pipe blank is put into the first annular cavity between the extrusion inner mold and the extrusion outer mold first, the first metal pipe layer of the composite pipe blank is heated to the first target temperature, and the second metal pipe layer of the composite pipe blank is heated to the second target temperature, then one end of the extrusion inner mold is pushed to drive the composite pipe blank to be formed by extrusion from an extrusion end of the first annular cavity to raise the temperature of the first contact interface between the structures of the composite pipe blank to the preset temperature in the forming process, wherein the preset temperature is greater than or equal to the melting point temperature, and the first contact interface is re-melt to form the first metallurgical bonding interface to obtain the target composite pipe blank.

Figure 11:
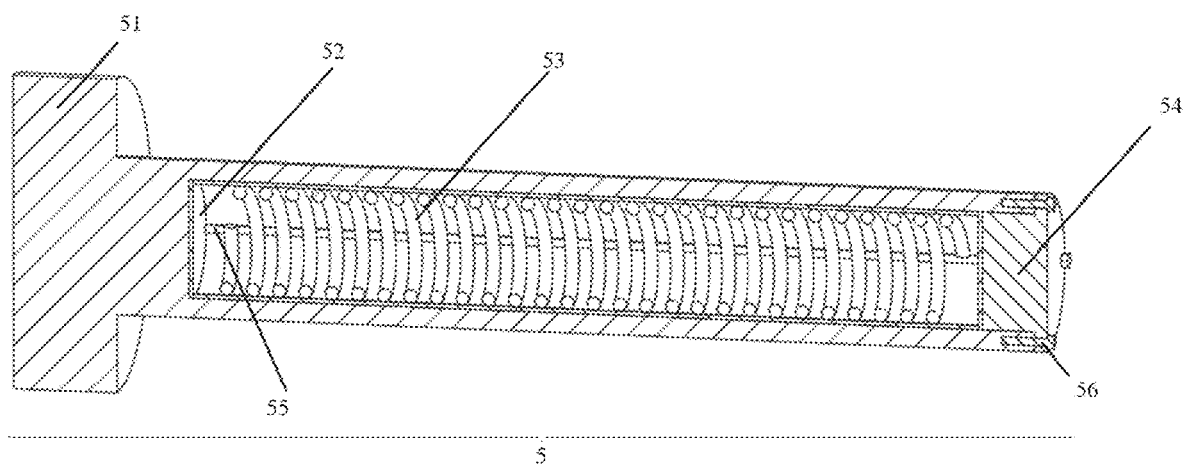
FIG. 11 is a schematic sectional view of an extrusion inner mold provided by the present invention.
Figure 12:
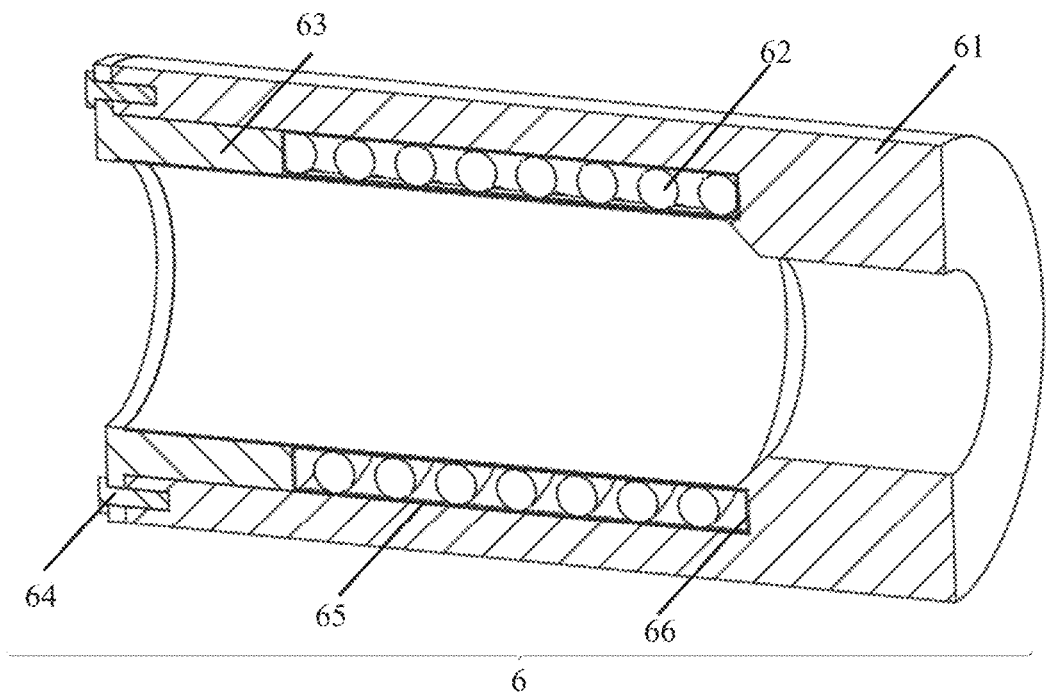
FIG. 12 is a schematic sectional view of an extrusion outer mold provided by the present invention.
Figure 13:
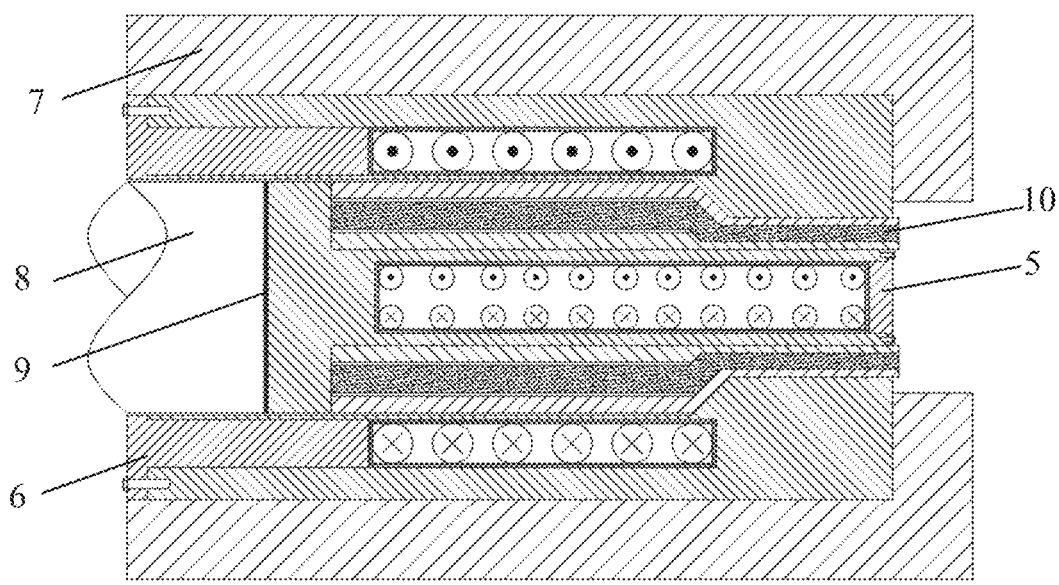
FIG. 13 is a schematic diagram of forming a target composite pipe by extrusion provided by the present invention.

Referring to FIG. 11 to FIG. 13, the extrusion tool adopted in the above step comprises:

an extrusion inner mold 5, wherein as shown in FIG. 11, the extrusion inner mold 5 comprises an inner mold cylinder 51 with a T-shaped structure, the inner mold cylinder 51 comprises a head part and a tailing part, the tailing part is provided with a cylinder cavity, the first induction heating coil 53 is arranged in the cylinder cavity, an inner mold insulating pad is arranged between the first induction heating coil 53 and the cylinder cavity, the inner mold insulating pad comprises an inner mold circular insulating gasket 52 and an inner mold strip-shaped insulating glue cushion 55, the inner mold circular insulating gasket 52 and the inner mold strip-shaped insulating glue cushion 55 separate the first induction heating coil from an inner surface of the inner mold cylinder to avoid contact and conduction; one end of the cylinder cavity far from the head part of the inner mold cylinder is provided with an inner mold end cover 54, the inner mold end cover 54 is connected with the inner mold cylinder 51 through an inner mold fastening screw 56, and the inner mold end cover 54 is used for forming an enclosed space in the cylinder cavity;

an extrusion outer mold 6, wherein a second induction heating coil 62 is arranged in the second induction heating coil 6, an inner wall of the extrusion outer mold 6 comprises a large-diameter section, a slope section and a small-diameter section, the large-diameter section and the small-diameter section are in transition connection through the slope section, as shown in FIG. 13, the large-diameter section of the extrusion outer mold 6 is matched and sleeved with the head part of the inner mold cylinder, the first annular cavity is formed between the inner wall of the extrusion outer mold 6 and a tailing part of the extrusion inner mold, and one end of the first annular cavity close to the small-diameter section is an extrusion end;

as shown in FIG. 12, a body of the extrusion outer mold 6 in the above structure is an outer mold cylinder 61, and a second annular cavity is arranged between the inner wall of the large-diameter section of the outer mold cylinder and the outer wall of the outer mold cylinder, and the second induction heating coil 62 is arranged in the second annular cavity; the second induction heating coil 62 is separated from the second annular cavity by an outer mold insulating pad, the outer mold insulating pad comprises an outer mold strip-shaped insulating glue cushion 65 and an outer mold annular insulating gasket 66, an outer mold end cover 63 is arranged at one end of the second annular cavity far from the small-diameter section, and the outer mold end cover 63 and the outer mold cylinder 61 are connected through an outer mold fastening screw 64 to form an enclosed space in the second annular cavity;

an extruder 7, used for clamping and fixing an outer wall of the extrusion outer mold 6; and an extrusion head 8, used for pushing the extrusion inner mold 5 to make the composite pipe blank move along the axial direction and be extruded from the extrusion end of the first annular cavity. A graphite gasket 9 is arranged between the extrusion head 8 and the extrusion inner mold 5.

Specifically, the step S2 may be realized on the basis of the following steps:

Step S21: putting the composite pipe blank into the first annular cavity formed by the extrusion inner mold and the extrusion outer mold;

S22: fixing the extrusion outer mold 6 by the extruder 7, starting the first induction heating coil 53 arranged in the extrusion inner mold 5 to heat the first metal pipe layer of the composite pipe blank to the first target temperature, and starting the second induction heating coil 62 arranged in the extrusion outer mold 6 to heat the second metal pipe layer of the composite pipe blank to the second target temperature;

wherein, the first target temperature and the second target temperature which are set to be different are smaller than and close to the melting point temperature of the annular pre-fabricated foam blank; and Step 23: pushing one end of the extrusion inner mold by an extrusion head to move along an axial direction of the composite pipe blank, so that the composite pipe blank is extruded from an extrusion end of the first annular cavity and formed, and the temperature of the first contact interface is raised to a preset temperature during extrusion, and the first contact interface is re-melt to form the first metallurgical bonding interface, to obtain the target composite pipe blank, wherein the extrusion end is used for applying a radial pressure to the composite pipe blank.

According to the above method, the extrusion tool is adopted to prepare the target composite pipe blank, and the extrusion tool uses the independent induction heating coils to perform induction heating on different metal pipe layers at the same time, thus realizing accurate control of the temperature, ensuring that deformation resistance of the first corrugated metal layer and the second corrugated metal layer at high temperature is close to that of the square pre-fabricated foam blank at room temperature, effectively avoiding a surface to be composited from oxidation, realizing coordinated deformation, and greatly improving a success rate and a stability of preparing the target composite pipe blank, wherein an electromagnetic induction frequency can be adjusted according to an extrusion speed when extruding the pipe composite blank, which realizes accurate on-line temperature control and further improves a production efficiency and a stability. In addition, the extrusion tool realizes the preparation of the target composite pipe blank through clearance fit between electromagnetic temperature control and extrusion, so that the target composite pipe blank has a metallurgical bonding interface, which effectively solves the problem that the composite pipe blank with clearance fit casing pipe is difficult to form.

Figure 14:
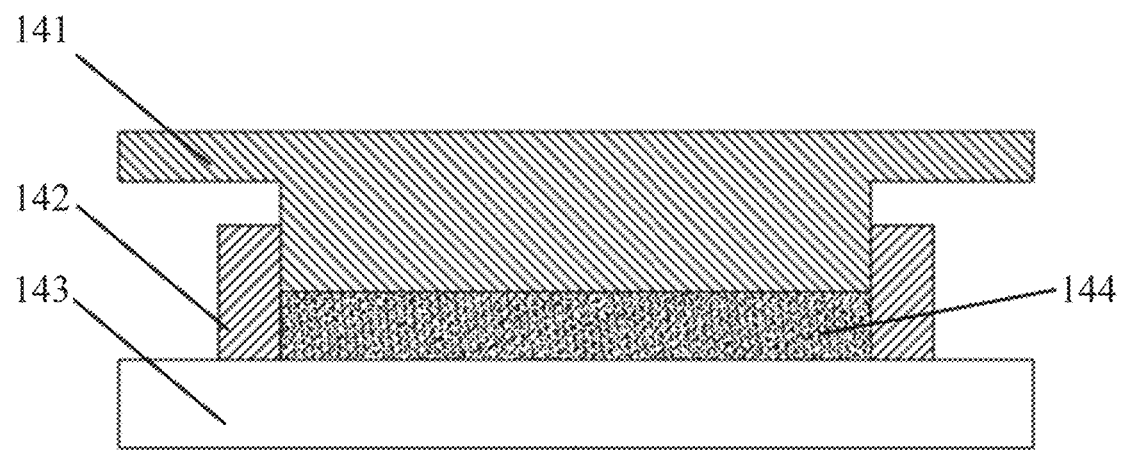
FIG. 14 is a schematic diagram of preparing a square pre-fabricated foam blank layer provided by the present invention.
Figure 15:
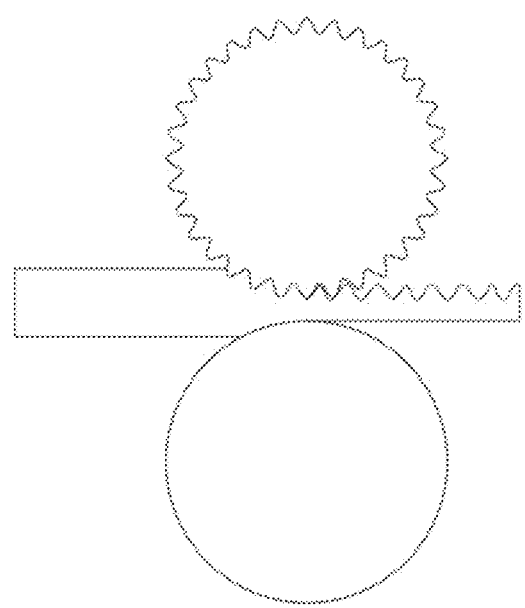
FIG. 15 is a schematic diagram of a rolling process of a corrugated metal plate provided by the present invention.
Figure 16:
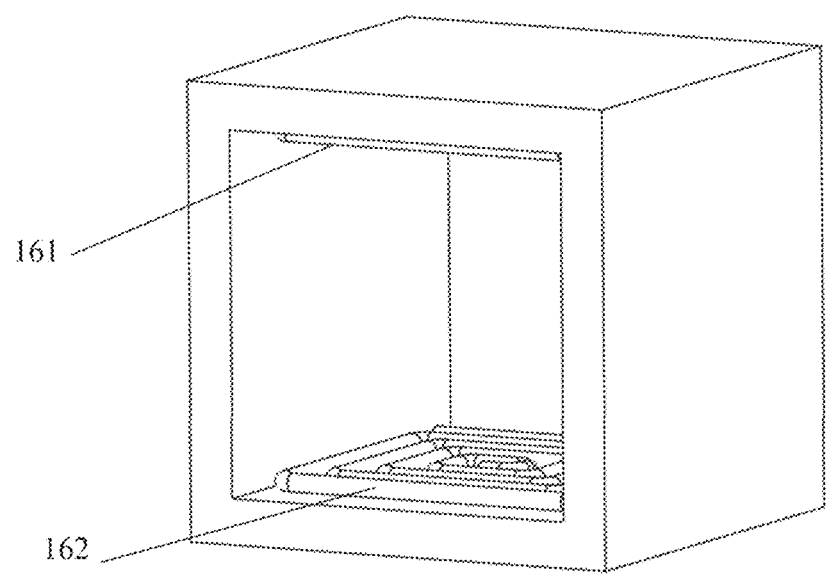
FIG. 16 is a schematic structural diagram of a foam metal sandwich composite plate induction heating device provided by the present invention.

Alternatively, before assembling the foam metal sandwich composite pipe, the foam metal sandwich flange and the foam metal sandwich end cover, the method further comprises:

preparing the foam metal sandwich flange and the foam metal sandwich end cover;

The preparing the foam metal sandwich flange and the foam metal sandwich end cover, comprises the following steps:

Step S31: providing one composite plate blank, wherein the composite plate blank sequentially comprises a first corrugated metal layer, a square pre-fabricated foam blank layer and a second corrugated metal layer from top to bottom; and the first corrugated metal layer and the second corrugated metal layer are corrugated metal plates with a corrugated interface on one side; the first corrugated metal layer is made of the same material as the first metal pipe layer, and the second corrugated metal layer is made of the same material as the second metal pipe layer;

referring to FIG. 14 to FIG. 16, the preparing the composite plate blank comprises the steps:

providing two metal plates;

as shown in FIG. 14, putting a second foaming powder into a square cavity formed by a square mold 142, starting a second vibrating base 143, and pressing the second foaming powder by a square extrusion head 141 to obtain a square pre-fabricated foam blank 144 by the second foaming powder under sustained oscillation of the second vibrating base and extrusion of the square extrusion head;

rolling the two metal plates by a corrugation-flattening mill to obtain the first corrugated metal layer and the second corrugated metal layer; wherein, as shown in FIG. 15, an upper roll of the corrugation-flattening mill is a corrugation roll, and a lower roll of the corrugation flattening mill is a flattening roll; and the first corrugated metal layer and the second corrugated metal layer are corrugated metal layers with a corrugated interface on one side;

placing the square pre-fabricated foam blank between the first corrugated metal layer and the second corrugated metal layer for blank assembling to obtain the composite plate blank. The square pre-fabricated foam blank is in contact with corrugated interfaces of the two corrugated metal layers, and the composite plate blank is a sandwich structure.

Figure 17:
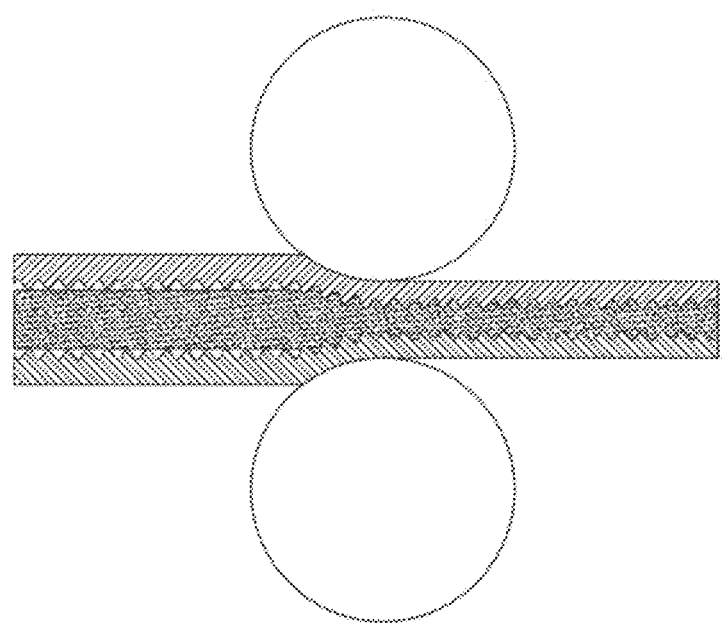
FIG. 17 is a schematic diagram of rolling and forming a composite plate blank provided by the present invention

Step S32: heating the composite plate blank by using a foam metal sandwich composite plate induction heating device, wherein, as shown in FIG. 16, the first corrugated metal layer is heated to the first target temperature by a third induction heating coil 161 arranged at a top part, and the second corrugated metal layer is heated to the second target temperature by a fourth induction heating coil 162 arranged at a bottom part, so as to obtain a composite plate blank with different temperatures;

Step S33: as shown in FIG. 17, rolling the composite plate blank with different temperatures to tightly combine the first corrugated metal layer, the square pre-fabricated foam blank layer and the second corrugated metal layer, and raising a temperature of a second contact interface between structures of the composite plate blank with different temperatures to a preset temperature in a forming process, wherein the preset temperature is greater than or equal to the melting point temperature, and the second contact interface is re-melt to form a second metallurgical interface to obtain a target composite plate; wherein, the square pre-fabricated foam blank and the annular pre-fabricated foam blank have the same material, the same melting point and the same foaming temperature; and placing the target composite plate in a heating furnace with a temperature being a third target temperature for a preset time, so that the square pre-fabricated foam blank in a middle layer of the target composite plate is foamed to form a second foam metal layer and obtain a foam metal sandwich composite plate; wherein, the third target temperature is greater than or equal to a foaming temperature;

In the above steps S32 and S33, the separate induction heating coils are used to heat the first corrugated metal layer and the second corrugated metal layer of the composite plate blank to different temperatures, thus realizing accurate control of the temperature before rolling and compositing, ensuring that deformation resistance of the first corrugated metal layer and the second corrugated metal layer at high temperature is close to that of the square pre-fabricated foam blank at room temperature, effectively avoiding a surface to be composited from oxidation, realizing coordinated deformation, and greatly improving a success rate and a stability of preparing the foam metal sandwich composite plate. Surface layers of the foam metal sandwich flange and the foam metal sandwich end cover prepared by the above steps are two types of high-strength and corrosion-resistant metal plates, and core layers of the foam metal sandwich flange and the foam metal sandwich end cover are filled with foam metal, thus having high strength, high stability, high corrosion resistance and excellent sound absorption and vibration reduction performance.

Cutting the foam metal sandwich composite plate according to a preset size to obtain two foam metal sandwich flanges and two foam metal sandwich end covers.

Next, the preparation method of the hydraulic actuator shell provided by the present invention will be described in detail by way of example.

A TA1/304 foam aluminum sandwich shell for a deep-sea hydraulic actuator consists of a TA1/304 foam metal sandwich composite pipe, a TA1/304 foam metal sandwich flange and a TA1/304 foam metal sandwich end cover. The TA1/304 foam metal sandwich composite pipe is connected with the TA1/304 foam metal sandwich flange by welding, and the TA1/304 foam metal sandwich flange and the TA1/304 foam metal sandwich end cover are connected by a bolt and a sealing glue cushion. A preparation method of the TA1/304 foam aluminum sandwich shell comprises two part.

The first part refers to a preparation method of the TA1/304 foam metal sandwich composite pipe. A first metal layer of the foam metal sandwich composite pipe is made of a TA1 seamless pipe and a second metal layer of the foam metal sandwich composite pipe is made of a 304 stainless steel seamless pipe. The method comprises the following steps:

Step 11: preparation of a foaming powder: selecting a metal Ca as a tackifier and a titanium metal hydride as a foaming agent powder, pre-oxidizing the foaming agent powder to delay a decomposition speed of the foaming agent powder in heating and foaming processes, mixing an aluminum alloy powder, the tackifier and the foaming agent powder according to 95%, 3% and 2% by mass to obtain a foaming powder, and then pouring the foaming powder into a third annular cavity formed by an outer mold for pipe blank forming and an inner mold for pipe blank forming, and using an annular extrusion head to press the foaming powder into an annular pre-fabricated foam blank with an outer diameter of 178 mm, a wall thickness of 18 mm and a length of 500 mm, wherein a first vibrating base continuously works during a pressing process to ensure that a compact annular pre-fabricated foam blank of foamed aluminum can be obtained;

Step 12: blank assembling: selecting a TA1 seamless pipe with an outer diameter of 200 mm, a wall thickness of 10 mm and a length of 500 mm and a 304 stainless steel seamless pipe with an outer diameter of 140 mm, a wall thickness of 10 mm and a length of 500 mm, cleaning with alcohol to remove oil stains, then polishing an inner surface of the TA1 seamless pipe and an outer surface of 304 stainless steel seamless pipe, and assembling the blank by gap fitting in a sequence of the TA1 seamless pipe, the annular pre-fabricated foam blank and the 304 stainless steel seamless pipe to obtain a TA1/304 foam aluminum sandwich composite pipe blank;

Step 13: calculating a first target temperature and a second target temperature according to an equation (1), wherein the TA1 seamless pipe in the TA1/304 foam aluminum sandwich composite pipe blank has a density of 4.51 g/cm$^3$, and a specific heat capacity of 0.526 J/g, the 304 stainless steel seamless pipe in the TA1/304 foam aluminum sandwich composite pipe blank has a specific density of 7.93 g/cm$^3$, and a specific heat capacity of 0.5 J/g, and a melting point temperature of the annular pre-fabricated foam blank is 660° C. By substituting these data into the equation (1), it may be obtained that the first target temperature of the TA1 seamless pipe is 550° C., and the second target temperature of the 304 stainless steel seamless pipe is 600° C.;

Step 14: electromagnetic temperature control and compositing by extrusion: sleeving a TA1/304 composite pipe blank into an extrusion inner mold with an outer diameter of 110 mm, and sending the extrusion inner mold and the composite pipe blank into an un-deformed area of an extrusion outer mold together, then starting induction heating coils arranged in the extrusion inner mold and the extrusion outer mold, respectively heating the TA1 seamless pipe and the 304 stainless steel seamless pipe to 550° C. and 600° C., turning off the induction heating coils and starting an extruder at the same time, pushing the extrusion inner mold by an extrusion head to drive the composite pipe blank to penetrate through the extrusion outer mold with an inner diameter of 170 mm in a forming area, and extruding a seamless metal composite pipe blank from the extrusion mold; before compositing by extrusion, heating the TA1 seamless pipe and the 304 stainless steel seamless pipe to 550° C. and 600° C. respectively, which are both lower than the melting point (660° C.) of the pre-fabricated foam blank; wherein, after induction heating, a temperature of an annular pre-fabricated foam blank in the middle layer of the composite pipe blank is lower than that of the seamless pipe; as titanium has low thermal conductivity and high thermal expansion coefficient, it is easier to absorb heat and quickly heat up during plastic deformation; under the same conditions, the titanium usually heats up faster than the stainless steel, so a starting temperature of the TA1 seamless pipe is set to be higher than that of the 304 stainless steel seamless pipe; under the combined deformation of extrusion, a temperature of a contact interface between the TA1 seamless pipe and the 304 stainless steel seamless pipe and the annular pre-fabricated foam blank rises above the melting point temperature of the annular pre-fabricated foam blank, realizing interface re-melting to form metallurgical bonding, but the annular pre-fabricated foam blank does not reach a foaming temperature (550° C.) and will not be pre-foamed; and Step 15: thermal insulation and foam forming: placing the target composite pipe blank prepared in the step 13 in a heating furnace with a temperature of 550° C. for 3 minutes, wherein the annular pre-fabricated foam blank is decomposed during heating to generate bubbles, foam metal aluminum is formed by the pre-fabricated foam blank of the middle layer, and an end part is cut off after the heat preservation and foaming is completed to obtain the TA1/304 foam aluminum sandwich composited pipe with interface metallurgical bonding.

The second part refers to a preparation method of a TA1/304 foam aluminum sandwich flange and a TA1/304 foam aluminum sandwich end cover, which comprises the following steps:

Step 21: preparation of a pre-fabricated foam blank: selecting a metal Ca as a tackifier and a titanium metal hydride as a foaming agent powder, pre-oxidizing the foaming agent powder to delay a decomposition speed of the foaming agent powder in heating and foaming processes, mixing an aluminum alloy powder, the tackifier and the foaming agent powder according to 95%, 3% and 2% by mass to obtain a foaming powder, and then using a square mold to press the foaming powder into a square pre-fabricated foam blank of foam aluminum with a size of 250 mm*250 mm*10 mm;

Step 22: pre-fabrication of a corrugated metal plate: rolling a TA1 titanium plate and a 304 stainless steel plate with a size of 250*250 mm*5 mm by using a corrugation-flattening mill with a corrugated upper roll and a flattening lower roll to obtain a TA1 titanium plate and a 304 stainless steel plates with a corrugated interface on one side;

Step 23: grinding and blank assembling: grinding the corrugated interfaces of the TA1 titanium plate and the 304 stainless steel plate with a wire brush, removing an oxide at the corrugated interface, stacking and assembling the blanks in a sequence of the TA1 titanium plate, the square pre-fabricated foam blank of foam aluminum and the 304 stainless steel plate to obtain a TA1/304 aluminum foam sandwich plate composite blank, wherein the corrugated interface is in contact with the square pre-fabricated foam blank of foam aluminum during blank assembling;

Step 24: heating the composite blank by electromagnetic induction: putting the TA1/304 aluminum foam sandwich plate composite blank into an induction heating device, turning on top and bottom induction heating coils, and heating the TA1 titanium plate and the 304 stainless steel plate to target temperatures of 550° C. and 600° C. respectively, which are both lower than the melting point (660° C.) of the pre-fabricated foam blank; wherein, as titanium has low thermal conductivity and high thermal expansion coefficient, it is easier to absorb heat and quickly heat up during rolling; under the same conditions, the titanium usually heats up faster than the stainless steel, so a heating temperature of the TA1 titanium plate is higher than that of the 304 stainless steel plate;

Step 25: compositing by rolling: sending the heated TA1/304 aluminum foam sandwich plate composite blank to a two-roll flattening mill for compositing by rolling, and finally obtaining a composite metal plate blank after cooling; wherein, due to the deformation and heat transfer under the action of rolling deformation, a temperature of a contact interface between the TA1 titanium plate and the 304 stainless steel plate and the square pre-fabricated foam blank rises above the melting point temperature of the melting point temperature, realizing interface re-melting to form metallurgical bonding, but the square pre-fabricated foam blank does not reach a foaming temperature (550° C.) and will not be pre-foamed; and Step 26: heat preservation and foam forming: placing the composite metal plate blank in a heating furnace with a temperature of 550° C. for three minutes; wherein, during a heating process, the square pre-fabricated foam blank is decomposed to generate bubbles, the square pre-fabricated foam blank in the middle layer forms a foam metal layer, and after the heat preservation and foam forming is completed, a foam aluminum sandwich composite plate is obtained, wherein a first corrugated metal layer of the foam aluminum sandwich composite plate is made of TA1, and a second corrugated metal layer of the foam aluminum sandwich composite plate is made of 304 stainless steel. The foam aluminum sandwich composite plate is cut to obtain the TA1/304 foam aluminum sandwich flange and the TA1/304 foam aluminum sandwich end cover with corrugated metallurgical bonding interfaces, wherein the foam metal sandwich flange has an outer diameter of 240 mm, an inner diameter of 100 mm and a thickness of 15 mm, while the foam metal sandwich end cover has an outer diameter of 240 mm and a thickness of 15 mm; six through holes with a diameter of 8 mm are machined on circumferences of the foam metal sandwich flange and the foam metal sandwich end cover with a diameter of 230 mm, and a bolt penetrates through the through hole for fastening and connection.

Finally, the TA1/304 foam aluminum sandwich composited pipe, the TA1/304 foam aluminum sandwich flange and the TA1/304 foam aluminum sandwich end cover prepared are cleaned, then the TA1/304 foam aluminum sandwich flange is welded at two ends of the TA1/304 foam aluminum sandwich composited pipe, and the TA1/304 foam aluminum sandwich flange and the TA1/304 foam aluminum sandwich end cover are connected by a bolt for sealing to obtain the TA1/304 foam aluminum sandwich shell needed.

In the description of the above embodiments, the particular features, structures, materials, or characteristics described may be combined in a suitable manner in any one or more embodiments or examples.

The foregoing descriptions are merely detailed embodiments of the present invention, but the protection scope of the present invention is not limited thereto. Any person skilled in the art can easily think of changes or substitutions within the technical scope of the invention, and all the changes or substitutions should be covered by the protection scope of the present invention. Therefore, the protection scope of the present invention should be subjected to the protection scope of the claims.

We claim:

1. A hydraulic actuator shell, comprising a foam metal sandwich composite pipe, a foam metal sandwich flange and a foam metal sandwich end cover, wherein:

the foam metal sandwich composite pipe is connected with one end of the foam metal sandwich flange, and the foam metal sandwich end cover is connected with the other end of the foam metal sandwich flange; the foam metal sandwich flange is in an annular cylindrical structure, the foam metal sandwich end cover is a cylindrical structure, an outer diameter of the foam metal sandwich flange is the same as a diameter of the foam metal sandwich end cover, a plurality of first through holes are uniformly arranged on a toroidal surface of the foam metal sandwich flange along a circumferential direction, and a plurality of second through holes in one-to-one correspondence with the first through holes are arranged on a circular surface of the foam metal sandwich end cover; the foam metal sandwich end cover and the foam metal sandwich flange are cut by a foam metal sandwich composite plate, the foam metal sandwich composite plate sequentially comprises a first corrugated metal layer, a second foam metal layer and a second corrugated metal layer from top to bottom, a bonding interface among the first corrugated metal layer, the second corrugated metal layer and the second foam metal layer is a second metallurgical bonding interface, and the second bonding interface is a corrugated interface;

the foam metal sandwich composite pipe comprises a first metal pipe layer, a first foam metal layer and a second metal pipe layer sequentially arranged from inside to outside; and a first bonding interface among the first metal pipe layer, the first foam metal layer and the second metal pipe layer is a metallurgical bonding interface;

the foam metal composite pipe is obtained by placing a target composite pipe blank in a heating furnace and foaming a middle layer of the target composite pipe blank to form the first foam metal layer;

the target composite pipe is obtained by putting a composite pipe blank into a first annular cavity formed by an extrusion inner mold and an extrusion outer mold, fixing the extrusion outer mold by an extruder, starting a first induction heating coil arranged in the extrusion inner mold to heat the first metal pipe layer to a first target temperature, starting a second induction heating coil arranged in the extrusion outer mold to heat the second metal pipe layer to a second target temperature, and pushing one end of the extrusion inner mold by a extrusion head to move along an axial direction of the composite pipe blank, so that the composite pipe blank is extruded from an extrusion end of the first annular cavity and formed, and a temperature of a first contact interface is raised to a preset temperature during extrusion, and the first contact interface is re-melt to form the first metallurgical bonding interface; wherein, the preset temperature is greater than or equal to a melting point temperature of an annular pre-fabricated foam blank, a target temperature comprises the first target temperature and the second target temperature, and the first target temperature and the second target temperature are both smaller than the melting point temperature;

the composite pipe blank comprises a first metal pipe layer, an annular prefabricated foam blank and a second metal pipe layer from inside to outside; and the foam metal sandwich composite pipe is prepared by an extrusion tool, and the extrusion tool comprises:

the extrusion inner mold, wherein the extrusion inner mold comprises an inner mold cylinder with a T-shaped structure, the inner mold cylinder comprises a head part and a tailing part, the tailing part is provided with a cylinder cavity; the first induction heating coil is arranged in the cylinder cavity, an inner mold insulating pad is arranged between the first induction heating coil and the cylinder cavity, an inner mold end cover is arranged at one end of the cylinder cavity far from the head part, the inner mold end cover is connected with the inner mold cylinder through an inner mold fastening screw, and the inner mold end cover is used for forming an enclosed space in the cylinder cavity;

the extrusion outer mold, wherein the second induction heating coil is arranged in the extrusion outer mold, an inner wall of the extrusion outer mold comprises a large-diameter section, a slope section and a small-diameter section, the large-diameter section and the small-diameter section are in transition connection through the slope section, the large-diameter section of the extrusion outer mold is matched and sleeved with the head part of the inner mold cylinder, the first annular cavity is formed between the inner wall of the extrusion outer mold and a tailing part of the extrusion inner mold, and one end of the first annular cavity close to the small-diameter section is an extrusion end;

the extruder, used for clamping and fixing an outer wall of the extrusion outer mold; and the extrusion head, used for pushing the extrusion inner mold to make the composite pipe blank move along the axial direction and be extruded from the extrusion end of the first annular cavity.

2. A preparation method of a hydraulic actuator shell used for preparing the hydraulic actuator shell according to claim 1, wherein the method comprises:

providing one composite pipe blank, wherein the composite pipe blank comprises a first metal pipe layer, an annular prefabricated foam blank and a second metal pipe layer from inside to outside;

heating the composite pipe blank to a target temperature, and forming the composite pipe blank by extrusion to raise a temperature of a first contact interface between structures of the composite pipe blank to a preset temperature in a forming process, wherein the preset temperature is greater than or equal to a melting point temperature of the annular pre-fabricated foam blank, and the first contact interface is re-melt to form a first metallurgical bonding interface to obtain a target composite pipe blank; and the target temperature is smaller than the melting point temperature;

placing the target composite pipe blank in a heating furnace and foaming a middle layer of the target composite pipe blank to form a first foam metal layer and obtain a foam metal sandwich composite pipe; and assembling a foam metal sandwich composite pipe, a foam metal sandwich flange and a foam metal sandwich end cover to form the hydraulic actuator shell, wherein:

the target temperature comprises a first target temperature and a second target temperature; and the heating the composite pipe blank to the target temperature, and forming the composite pipe blank by extrusion to raise the temperature of the first contact interface between the structures of the composite pipe blank to the preset temperature in the forming process, wherein the preset temperature is greater than or equal to the melting point temperature of the annular pre-fabricated foam blank, and the first contact interface is re-melt to form a first metallurgical bonding interface to obtain a target composite pipe blank, comprises:

putting the composite pipe blank into a first annular cavity formed by an extrusion inner mold and an extrusion outer mold;

fixing the extrusion outer mold by an extruder, starting a first induction heating coil arranged in the extrusion inner mold to heat the first metal pipe layer to the first target temperature, and starting a second induction heating coil arranged in the extrusion outer mold to heat the second metal pipe layer to the second target temperature, and pushing one end of the extrusion inner mold by a extrusion head to move along an axial direction of the composite pipe blank, so that the composite pipe blank is extruded from an extrusion end of the first annular cavity and formed, and the temperature of the first contact interface is raised to a preset temperature during extrusion, and the first contact interface is re-melt to form the first metallurgical bonding interface, to obtain the target composite pipe blank, wherein the extrusion end is used for applying a radial pressure to the composite pipe blank; and a body of the extrusion outer mold is an outer mold cylinder, a second annular cavity is arranged between an inner wall and an outer wall of the large-diameter section, a second induction heating coil is arranged in the second annular cavity, the second induction heating coil is separated from the second annular cavity by an outer mold insulating pad, an outer mold end cover is arranged at one end of the second annular cavity far from the small-diameter section, and the outer mold end cover is connected with the outer mold cylinder to form an enclosed space in the second annular cavity.

3. The preparation method of the hydraulic actuator shell according to claim 2, wherein before assembling the foam metal sandwich composite pipe, the foam metal sandwich flange and the foam metal sandwich end cover, the method further comprises:

preparing the foam metal sandwich flange and the foam metal sandwich end cover;

wherein, the preparing the foam metal sandwich flange and the foam metal sandwich end cover, comprises:

providing one composite plate blank, wherein the composite plate blank sequentially comprises a first corrugated metal layer, a square pre-fabricated foam blank and a second corrugated metal layer from top to bottom; and the first corrugated metal layer and the second corrugated metal layer are corrugated metal plates with a corrugated interface on one side;

heating the composite plate blank, heating the first corrugated metal layer to the first target temperature, and heating the second corrugated metal layer to the second target temperature to obtain a composite plate blank with different temperatures;

rolling the composite plate blank with different temperatures to tightly combine the first corrugated metal layer, the square pre-fabricated foam blank layer and the second corrugated metal layer, and raising a temperature of a second contact interface between structures of the composite plate blank with different temperatures to a preset temperature in a forming process, wherein the preset temperature is greater than or equal to the melting point temperature, and the second contact interface is re-melt to form a second metallurgical interface to obtain a target composite plate;

placing the target composite plate in a heating furnace with a temperature being a third target temperature for a preset time, so that a middle layer of the target composite plate is foamed to form a second foam metal layer and obtain a foam metal sandwich composite plate; and cutting the foam metal sandwich composite plate according to a preset size to obtain two foam metal sandwich flanges and two foam metal sandwich end covers.

4. The preparation method of the hydraulic actuator shell according to claim 3, wherein before providing one composite plate blank, the method further comprises:
preparing a composite plate blank;
wherein, the preparing the composite plate blank, comprises:
providing two metal plates;
putting a second foaming powder into a square mold, and pressing the second foaming powder to obtain a square pre-fabricated foam blank;
rolling the two metal plates by a corrugation-flattening mill to obtain the first corrugated metal layer and the second corrugated metal layer; wherein an upper roll of the corrugation-flattening mill is a corrugation roll, and a lower roll of the corrugation flattening mill is a flattening roll; and
placing the square pre-fabricated foam blank between the first corrugated metal layer and the second corrugated metal layer for blank assembling to obtain the composite plate blank.

5. The preparation method of the hydraulic actuator shell according to claim 2, wherein before providing one composite pipe blank, the method further comprises:
preparing a composite pipe blank;
wherein, the preparing the composite pipe blank, comprises:
mixing a metal powder, a tackifier and a foaming agent powder according to a preset ratio to obtain a foaming powder; wherein the foaming powder comprises a first foaming powder and a second foaming powder;
pouring the first foaming powder into a third annular cavity consisting of an outer mold for pipe blank forming and an inner mold for pipe blank forming, starting a first vibrating base of a pipe blank sleeve mold, and pressing the foaming powder into an annular pre-fabricated foam blank by using an annular extrusion head during a vibrating process of the first vibrating base; and
placing the annular pre-fabricated foam blank in a gap between the first metal pipe layer and the second metal pipe layer of the composite pipe blank to obtain the composite pipe blank.

\* \* \* \* \*